(12) United States Patent
Yamanaka et al.

(10) Patent No.: US 7,143,942 B2
(45) Date of Patent: Dec. 5, 2006

(54) CARD PROCESSING APPARATUS AND SYSTEM, POS TERMINAL FOR CARD PROCESSING, AND CREDIT CARD PROCESSING CONTROL METHOD

(75) Inventors: Yukiko Yamanaka, Shiojiri (JP); Kae Shimokawa, Shiojiri (JP); Motofumi Shiraiwa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 109 days.

(21) Appl. No.: 10/932,181

(22) Filed: Sep. 1, 2004

(65) Prior Publication Data
US 2005/0087598 A1  Apr. 28, 2005

(30) Foreign Application Priority Data
Sep. 1, 2003 (JP) ............................. 2003-308688

(51) Int. Cl.
G06K 7/10 (2006.01)
(52) U.S. Cl. ................ 235/454; 235/449; 235/480
(58) Field of Classification Search ............... 235/454, 235/449, 480
See application file for complete search history.

(56) References Cited

U.S. PATENT DOCUMENTS

| | | | |
|---|---|---|---|
| 5,010,238 A | * | 4/1991 | Kadono et al. ............. 235/379 |
| 5,410,642 A | | 4/1995 | Hakamatsuka et al. |
| 5,448,047 A | * | 9/1995 | Nair et al. .................. 235/440 |
| 6,628,808 B1 | | 9/2003 | Bach et al. |
| 2002/0047047 A1 | * | 4/2002 | Poloniewicz et al. ....... 235/454 |
| 2002/0095343 A1 | * | 7/2002 | Barton et al. ................. 705/16 |

FOREIGN PATENT DOCUMENTS

| | | |
|---|---|---|
| JP | 05-250548 | 9/1993 |
| JP | 05-258120 | 10/1993 |
| JP | 06-135187 | 5/1994 |
| JP | 07-239648 | 9/1995 |
| JP | 10-021354 | 1/1998 |
| JP | 2000-259899 | 9/2000 |
| JP | 2000-322633 | 11/2000 |
| JP | 2001-101484 | 4/2001 |

* cited by examiner

*Primary Examiner*—Jared J. Fureman
*Assistant Examiner*—Kristy A. Haupt
(74) *Attorney, Agent, or Firm*—Anderson Kill & Olick, P.C.; Eugene Lieberstein

(57) ABSTRACT

To reliably process a card such as a credit card to acquire accurate card information in accordance with the present invention without lowering job productivity, magnetic data is read from the card and in the same operation the front of the card is scanned to secure an image of data information such as the card number. The resulting image data is stored in memory. A control unit in conjunction with a reading evaluator such as a computer determines if the magnetic data has been successfully read or not. If reading the magnetic data is not successful, an OCR unit extracts the card number from the card by OCR processing of the scanned image data. The card number extracted by the OCR unit is then used for a card C authorization check.

26 Claims, 10 Drawing Sheets

CARD PROCESSING APPARATUS AND SYSTEM, POS TERMINAL FOR CARD PROCESSING, AND CREDIT CARD PROCESSING CONTROL METHOD

BACKGROUND OF THE INVENTION

1. Field of Technology

The present invention relates to a card processing apparatus and system, POS terminal for card processing and a card processing control method for processing card transactions.

2. Description of Related Art

Typically a card, such as a credit card, which contains embossed information identifying the credit card number and card owner and electronic information usually in the form of magnetic data stored in a magnetic stripe is processed by reading the magnetic data, using a magnetic stripe reader (MSR), whereupon the magnetic data is transmitted to a credit card company (verification server) for credit authorization as well as for checking if the credit card has been reported lost or stolen. An example of a credit card processing system is taught in Japanese Unexamined Patent Appl. Pub. H05-250548.

If the magnetic data cannot be automatically read by the MSR for some reason, the operator processing the transaction must manually enter the credit card number to the POS terminal using a keyboard. This number is then used for the credit card authorization check.

When paying by credit card at a store that uses a manual credit card imprinter instead of a credit authorization terminal (CAT), and in stores that have a CAT but the CAT does not recognize the card due to a problem with the magnetic stripe, vouchers are imprinted by the imprinter to acquire the card information. These credit card vouchers produce multiple copies similar to carbon copies of the embossed face of the credit card. The customer signs the voucher, and the customer and store each retain one copy. A signed voucher is also sent to the credit card company, which retains the vouchers in case of illegal credit card use.

This can result in problems such as described below.

(1) Data entry errors occur when keying in the credit card number, and operating a imprinter can be time-consuming particularly when the operator is not accustomed to using an imprinter. The customer is thus kept waiting, and productivity drops. This also makes the operator's job more difficult.

(2) Use of multipart forms and vouchers incurs the expense of storing and managing the forms and copies, as well as the cost of the paper itself.

(3) Card imprinting errors occur easily because the operator is often unaccustomed to using an imprinter. Information embossed on the card may therefore be inadequately copied, and by the time the problem is discovered later, the copy cannot be used as proof of illegal card use (i.e., as a record of a crime).

The present invention provides a card processing apparatus and system, a POS terminal for card processing, and a card processing control method for reliably acquiring card information from the card without lowering productivity.

SUMMARY OF THE INVENTION

The card processing apparatus and system of the present invention comprises a magnetic data reader for reading magnetic data from the card; an image scanner for imaging a surface of the credit card; an image data storage memory for storing the image captured by the image scanning means; a control unit for controlling the operation of the magnetic data reader and the image scanner; and a reading evaluator under the control of the control unit for determining if the magnetic data reading means has succeeded or failed in reading the magnetic data from the card. Preferably the apparatus further includes a card number extraction unit including an optical character recognition ("OCR") processor for extracting the card number of the credit card from the scanned image data when the reading evaluator determines that the magnetic data reading has failed.

The card processing system further comprises a computer under the control of the control unit which includes said reading evaluator for determining if the magnetic data reader has successfully read magnetic data from the card and if not for operating the card extraction unit to extract the card number from the card; and a card authorization server for verifying credit card authorization based on the card number extracted by the card number extraction unit. Preferably the computer is POS terminal computer which is connected to a POS server for controlling the POS terminal over a network such as the internet.

The present invention is also directed to a card processing control method for controlling the operation of card processing apparatus for processing card information stored as magnetic data in the card and image data inclusive of a card number on a surface of the card with the card processing apparatus including a magnetic data reader for reading the magnetic data from the card an image scanner for imaging image data on the surface of the card and an image data storage memory for storing the image data captured by the image scanner; with said control method comprising the steps of:

reading the magnetic data in the card;
scanning the image data from the surface of the card;
storing the card image data in memory;
determining if the magnetic data reader has successfully read the magnetic data or has failed to do so;
using an OCR processor for extracting the card number from the image data when the magnetic data reader has failed to read the magnetic data; and
running a card check to determine if proper authorization has been received or granted based on the extracted card number.

This invention thus extracts the credit card number by OCR processing image data scanned from the face of the credit card when reading the magnetic data fails. As a result, the card information can be acquired quickly and reliably.

Furthermore, because the operator does not need to manually enter the card number, data entry errors and the need to use a manual imprinter are eliminated. The job is therefore made easier and job productivity can be improved.

Furthermore, OCR processing occurs only when the magnetic data was not read correctly and the credit card authorization check is run using the conventional magnetic data when reading is successful. Accordingly, card transactions can thus be processed more quickly.

Furthermore, by scanning and storing an image of the credit card, the image data can also be used as evidence in case the credit card was used illegally.

Preferably, this credit card processing apparatus also has a printing means for printing the image data to receipt paper.

In this case, the control means also runs a printing step to print the image data to receipt paper.

Printing an image of the credit card on the receipt eliminates the need for multipart forms, thus saving the cost of managing voucher inventory and the vouchers themselves.

Further preferably, the printing means prints the credit card transaction amount and a signature line for the credit card user together with the image data.

In this case, the printing step run by the control means also prints the credit card transaction amount and a signature line for the credit card user together with the image data.

By printing the transaction amount charged to the credit card, the credit card image, and signature line on the receipt, which the customer then signs, the credit card, charge amount, and user's signature can be readily confirmed from the receipt. The receipt can then be saved and later used as proof if the credit card was used illegally.

Yet further preferably, the magnetic data reading means repeats reading the magnetic data if the reading evaluation means determines that magnetic data reading failed, and the card number extraction means extracts the card number of the credit card when magnetic data reading fails twice consecutively.

In this case, the magnetic data reading means repeats reading the magnetic data if magnetic data reading is determined to have failed, and if magnetic data reading fails twice consecutively, the control means extracts and uses the card number of the credit card for the credit card authorization check.

Productivity is also improved by automatically reading the magnetic data a second time when the magnetic data is not read correctly on the first pass. More specifically, the magnetic data can sometimes be read correctly on a second pass even when the first attempt fails. Therefore, by extracting the card number by OCR processing only when reading magnetic data fails twice consecutively rather than using OCR the first time magnetic stripe reading fails, the number of times that OCR processing is required can be greatly reduced. As a result, the transaction processing time can be shortened.

Yet further preferably, the credit card processing apparatus also has a display means for simultaneously displaying the image data and card number.

By thus simultaneously displaying the credit card image and card number on screen for review, the operator can easily confirm if the correct card number was extracted, i.e., if the OCR extraction was correct. Credit card authorization checks using the wrong credit card number can thus be prevented.

Other advantages and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of a credit card processing system, POS terminal, POS system, program, and credit card processing control method according to the present invention are described below with reference to the accompanying figures.

When magnetic data cannot be normally read from a credit card, the credit card number is extracted from the scanned image of the credit card face by means of optical character recognition (OCR). The card information can thus be quickly and dependably acquired. This also eliminates the need for the operator to enter the card number, thus eliminating data entry errors and the need to operate an imprinter to produce a voucher. The operator's job is thus made easier, and job productivity can be increased.

The subject invention is described below for use in a point-of-sale (POS) terminal such as is used in restaurants and retail stores, and as a hybrid device for use as part of a POS terminal. A hybrid device is a device combining multiple functions in a single unit. In this embodiment of the invention, the hybrid device has the function of a credit card processing apparatus for credit card scanning and magnetic data reading, the function of a check processing device including check scanning, MICR, and check printing, and the function of a receipt printer. A POS system including this POS terminal is also hereafter described.

Figure 1:
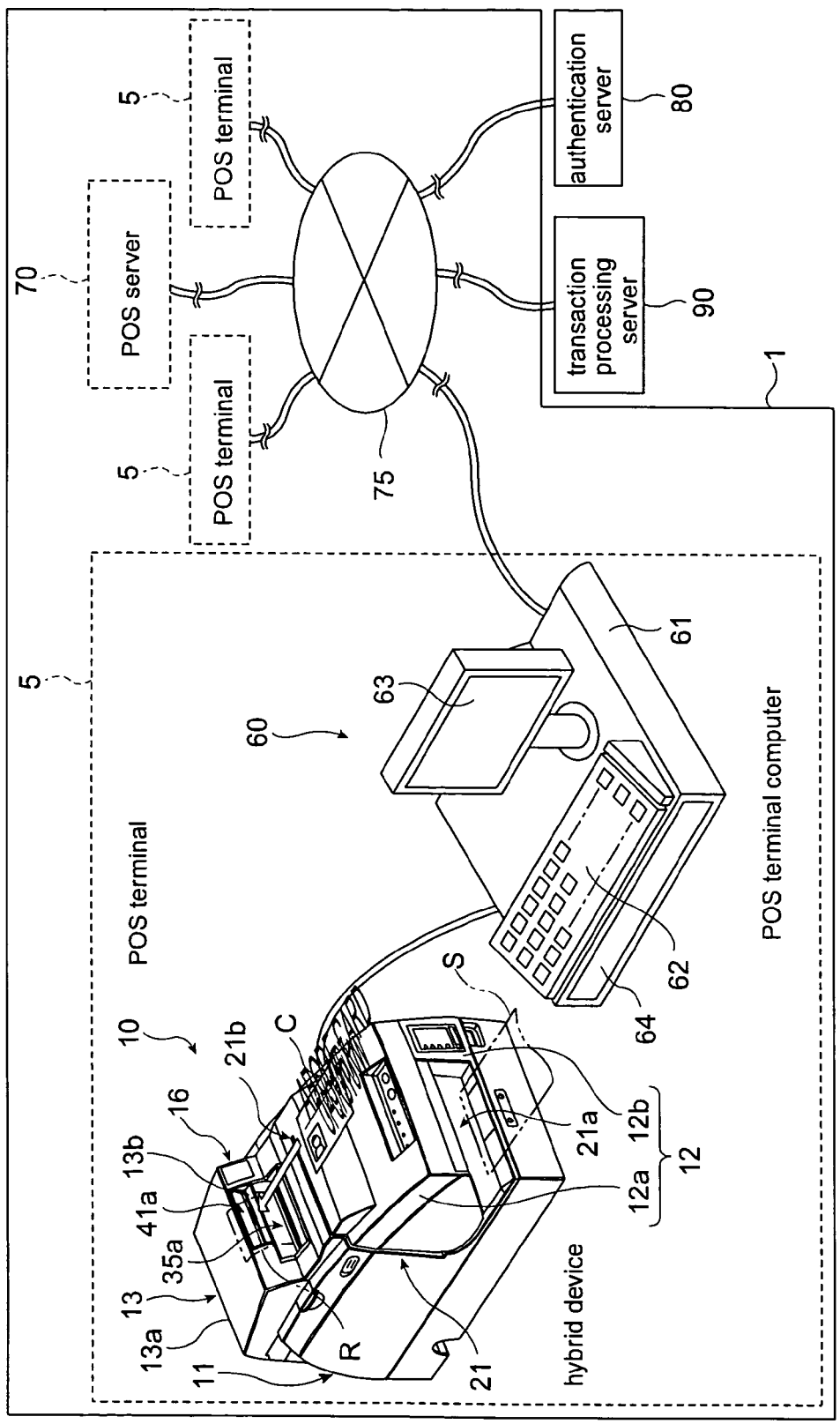
FIG. 1 is a schematic diagram of a POS system according to a preferred embodiment of the invention.
Figure 2:
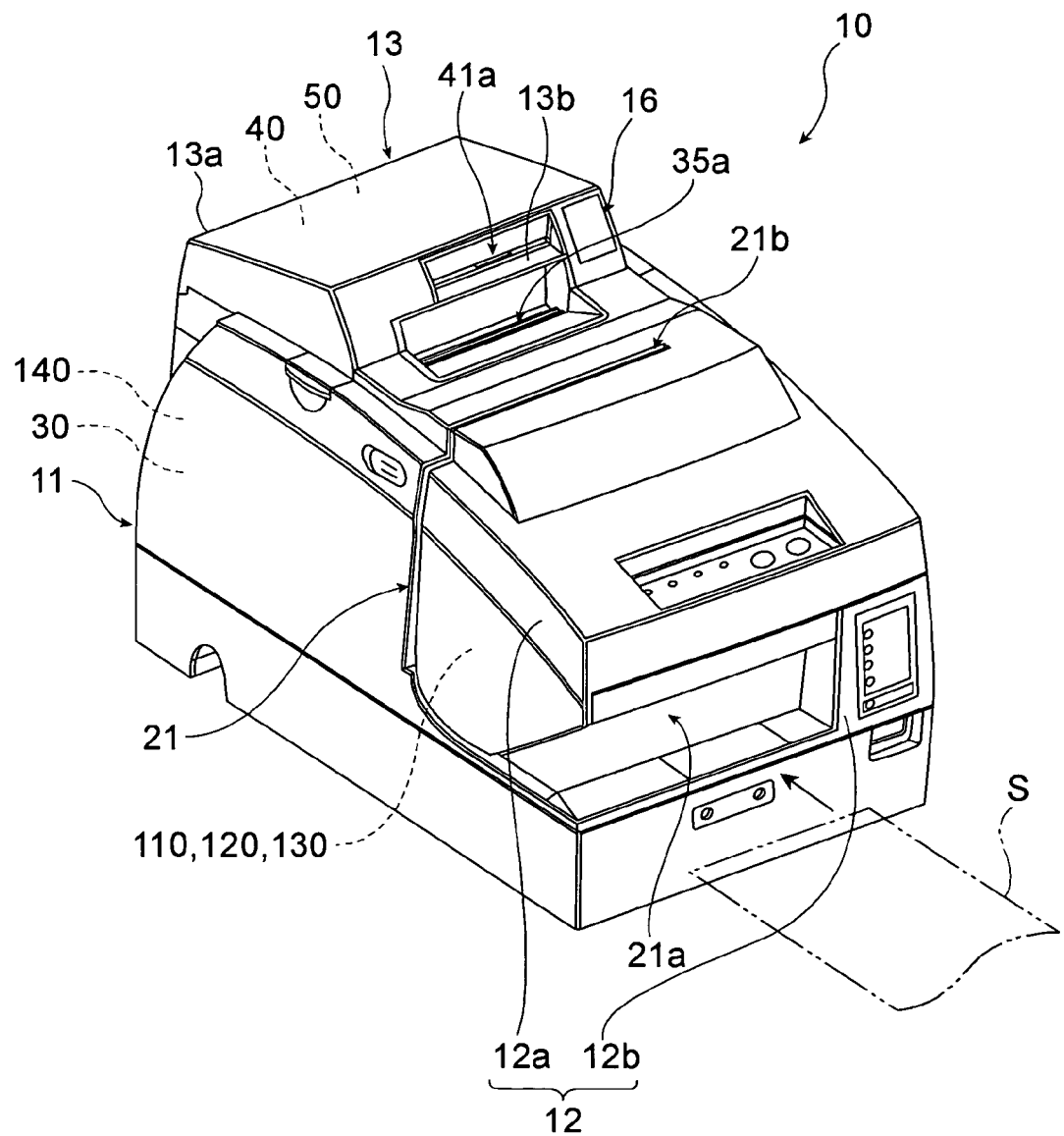
FIG. 2 is an oblique view of a hybrid device having the function of a credit card processing system according to a preferred embodiment of the invention.

As shown in FIG. 1 and FIG. 2, a POS terminal 5 according to the present invention includes a POS terminal computer 60 for calculating a transaction amount based on product information entered by an operator, and a hybrid device 10 for processing credit cards C and checks S (slips), as well as printing checks S (slips) and receipts R.

The POS terminal computer 60 has a main unit 61, a keyboard 62 for entering product information such as product codes and amount information, a display 63 for displaying the input product information and amount, as well as image data such as scanned from the face of a credit card C by the hybrid device 10, and a cash drawer 64 for holding cash and other instruments. The POS terminal computer 60 is connected via a network 75 such as the internet to a POS server 70.

The POS server 70 is connected to a plurality of POS terminals 5 (only three shown in the figure), for centrally managing and processing product information and inventory information from each of the POS terminals 5 respectively. More specifically, the POS server 70 acquires product information entered to a POS terminal 5, and retrieves product name and price information from the price list (PLU list) stored in the POS server 70. From the retrieved information, the POS server 70 then generates product data to be printed on a receipt R described below or displayed on the display 63, and sends this data to the POS terminal 5. Based on the product data sent from the POS server 70, the POS terminal 5 generates print data for printing on the receipt R, and sends this data to the hybrid processing device 10 while also generating display data for presentation on the display 63.

The POS terminal computer 60 is also connected over a network (Ethernet) 75 to an authentication server 80 for verifying and authorizing the credit card C, and a transaction processing server 90 for verifying check S validity.

The authentication server 80 is operated by a credit card company or clearing house (an organization that contracts with multiple credit card companies to provide centralized credit checks and risk evaluation services). Based on card information such as card number and magnetic data read from the credit card C by the hybrid device 10, the authentication server 80 runs a credit check to verify if the credit card was reported lost or stolen, and returns the risk evaluation result to the POS terminal computer 60.

The transaction processing server 90 determines check S validity and returns the result to the POS terminal computer 60 based on information read from the MICR code preprinted on the check S and read by the hybrid device 10.

The hybrid device 10 upon being connected to the POS terminal computer 60 through a connector not shown, scans and magnetically reads credit cards C, scans, magnetically reads, and prints checks S, and thus performs a number of operations in a single unit. A POS terminal 5 is capable of processing all types of credit cards C and checks S in accordance with the present invention by connecting the hybrid device 10 to the POS terminal computer 60.

The hybrid device 10 as more specifically shown in FIG. 2 has an integrally assembled back case unit 11, front case unit 12, and top cover unit 13. The back case unit 11 has a receipt paper compartment 30 for holding a roll of receipt R paper, and a receipt printing unit 140 for printing receipts R on the roll paper. The front case unit 12 is rendered in front of the back case unit 11 and forms a slip transportation path 21 through which checks and other slips S are conveyed between the front case unit 12 and back case unit 11. The top cover unit 13 is assembled to cover the top of the back case unit 11, and houses the credit card scanning unit 40 for imaging the face of the credit card C, and a credit card magnetic data reader 50 for reading the magnetic stripe part of the credit card C.

The front case unit 12 has a front side cover 12a separated from the back case unit 11 with the slip transportation path 21 therebetween, and a front side support portion 12b for supporting the cantilevered front side cover 12a. Slips S are inserted to the slip transportation path 21 from a slip insertion slot 21a, which is rendered at the front of the hybrid device below the front side cover 12a.

The slip transportation path 21 includes a slip insertion slot 21a from which checks S are inserted, a magnetic data reading unit (MICR (magnetic ink character reader)) 110 for reading the magnetic code (MICR code) preprinted in magnetic ink on the check S, a check scanner 120 for imaging the front and back sides of the check S, a check printer 130 for printing the transaction amount and store information on the check S, and a slip exit 21b from which checks S and other slips are discharged from the slip transportation path 21. Multiple transportation rollers are also disposed along the slip transportation path 21 for conveying checks S to the various stages of the slip transportation path 21.

Figure 3:
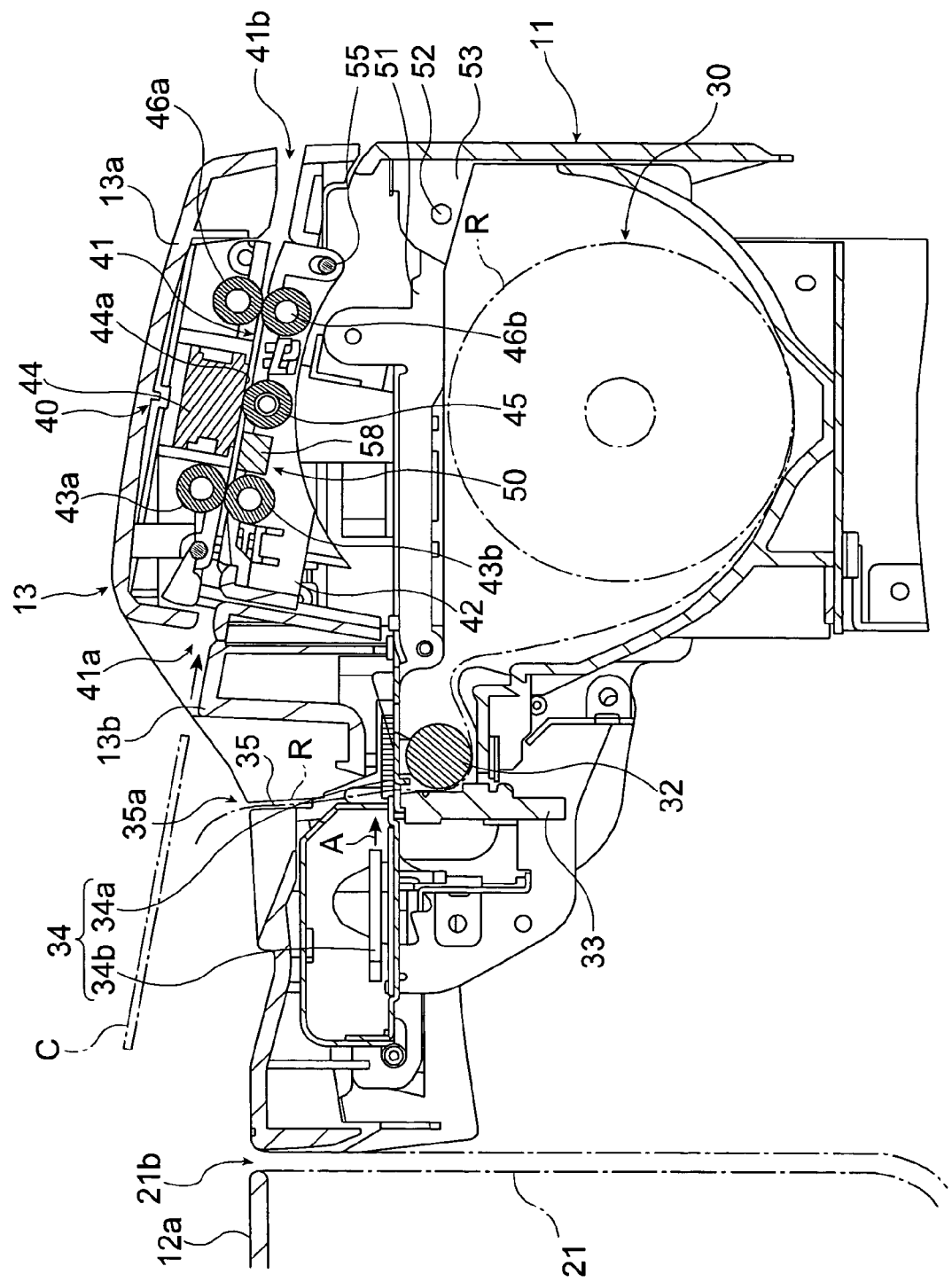
FIG. 3 is a partial section view of the hybrid device according to a preferred embodiment of the invention.

In addition to the credit card scanning unit 40 (image scanning sensor) for imaging the front of the credit card C, and credit card magnetic data reader 50 (MSR) for reading the magnetic stripe on the credit card C, a plurality of transportation rollers 43, 45, 46 (see FIG. 3) is also rendered to the top cover unit 13. These transportation rollers 43, 45, 46 convey the credit card C for processing. The transportation rollers 43, 45, 46 can also convey the credit card C forward and in reverse (that is, the rollers can drive in both directions), and the credit card C is scanned by the credit card scanning unit 40 while traveling toward the back of the machine (that is, to the left as seen in FIG. 3). The credit card scanning process and magnetic data reading process are described in further detail below.

Parts around the receipt transportation path 35 are described next with reference to FIG. 3. Receipt paper R is stored in a roll in the receipt paper compartment 30, delivered from the receipt paper compartment 30 and conveyed through the receipt transportation path 35 formed between the back case unit 11 and top cover unit 13, and discharged from the receipt exit 35a.

A thermal print head 33 and platen roller 32 for pressing the receipt paper to the thermal print head 33 face the receipt transportation path 35 so that the thermal print head 33 prints a receipt R as the paper is transported by the platen roller 32. The printed receipt R passes out from the receipt exit 35a from which it can be removed after cutting to an appropriate length by an automatic paper cutter 34 located above (i.e., downstream from) the thermal print head 33 and platen roller 32. The automatic paper cutter 34 includes a fixed knife 34a located on one side of the receipt transportation path 35, and a movable knife 34b located on the opposite side of the receipt transportation path 35 at a position corresponding to the fixed knife 34a. The movable knife 34b moves in the direction of arrow A in FIG. 3 into the receipt transportation path 35, and holds and cuts the receipt R paper with the fixed knife 34a.

The main frame 51 located below the top cover unit 13 is rendered pivotably to a fixed portion 53 of the back case unit 11 on an intervening hinge 52. This enables the top cover unit 13 to open and close to the receipt paper compartment 30. To replace the receipt R paper, the top cover unit 13 is opened, the roll of receipt R paper is placed in the receipt paper compartment 30, the paper leader is pulled out, and the top cover unit 13 is then closed.

Figure 4:
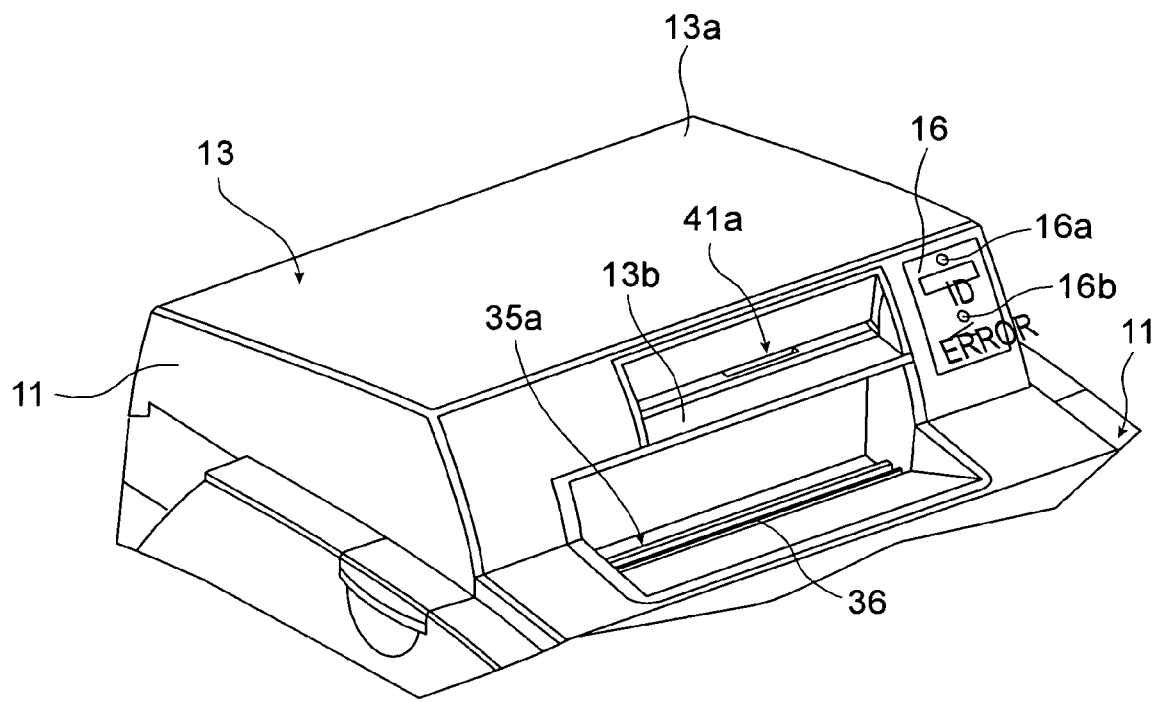
FIG. 4 is an oblique view of the top cover portion of a hybrid device according to a preferred embodiment of the invention.

The parts around the credit card scanning unit 40 and credit card magnetic data reader 50 are described next with reference to FIGS. 3 to 5. As shown in FIG. 3, the credit card scanning unit 40 and credit card magnetic data reader 50 are located between the top cover 13a and the receipt paper compartment 30 for imaging and magnetically reading a credit card C inserted from the card insertion slot 41a by the operator of the POS terminal 5.

A table 13b for guiding credit card C insertion is formed in front of the card insertion slot 41a, and the operator inserts the credit card C along this table 13b. An LED unit 16 for reporting information related to the credit card scanning and magnetic data reading operations is also provided on the top cover 13a near the card insertion slot 41a.

This LED unit 16 includes a card status LED 16a that lights according to the status of the credit card, and a transportation status LED 16b that lights according to the transportation status of the credit card C. The card status LED 16a lights according to the detection of credit card C insertion and discharge, and according to the status of credit card scanning and magnetic data reading. The transportation status LED 16b lights when a credit card C transportation error occurs.

The main parts of the credit card scanning unit 40 and credit card magnetic data reader 50 are a scan head 44 and magnetic head 58, respectively. The magnetic head 58 is located before the scan head 44 from the card insertion slot 41a side of the card transportation path 41. After insertion, the credit card C is conveyed forward by the multiple transportation rollers 43, 45, 46 and the magnetic stripe (magnetic data) is read. After the credit card C is conveyed to a specified position, the transportation rollers 43, 45, 46 reverse and the credit card C is imaged by the scanner as the card returns to the card insertion slot 41*a*.

The multiple transportation rollers 43, 45, 46 include first feed roller 43*a* and second feed roller 46*a* on the top side of the card transportation path 41 that are driven by a motor 90 (see FIG. 6), and first pressure roller 43*b*, pressure roller 45, and second pressure roller 46*b* located on the bottom side of the card transportation path 41. The first feed roller 43*a* and first pressure roller 43*b* transport the credit card C to the magnetic head 58 for reading, and then between the scan head 44 and pressure roller 45. The second feed roller 46*a* and second pressure roller 46*b* are located downstream from the scan head 44.

The magnetic head 58 reads magnetically encoded data recorded in a magnetic stripe on the back of the credit card C (the bottom side as the check is conveyed through the card transportation path 41), and is thus positioned according to the location of the magnetic stripe on credit cards. A magnetic head 58 could also be rendered on the top side of the card transportation path 41 to enable reading magnetic data from credit cards conforming to different standards. As described in further detail below, the magnetic data read by the magnetic head 58 is sent to the authentication server 80 operated by the credit card company for authorization.

As the pressure roller 45 presses the credit card C to the scanning surface 44*a* of the scan head 44 with pressure appropriate to the card thickness and the credit card C is conveyed through the card transportation path 41, the scan head 44 illuminates the top side of the credit card C, and the scanning surface 44*a* detects the light reflected from the credit card C to image the printed letters, images, and embossing on the credit card C surface. A plurality of photoelectric conversion elements not shown is arrayed in a line in lengthwise (that is, perpendicular to the card transportation direction) to the scanning surface 44*a*, and each element outputs an electrical signal according to the fight received by that element. As further described below, the image data scanned by the scan head 44 may be processed by OCR as needed to extract the card number and other card information from the embossed data. If the magnetic head 58 cannot read the magnetic stripe normally, the card number extracted from the image data is used for the credit check.

The first pressure roller 43*b*, pressure roller 45, and second pressure roller 46*b* are rotatably supported on an inside cover 42, which is disposed between the card transportation path 41 and receipt paper compartment 30. The inside cover 42 is pivotably assembled to guide walls 54 by way of hinge members 55 (see FIGS. 4 & 5). The guide walls 54 extend in the card transportation direction on both sides of the card transportation path 41, and rise perpendicularly to the transportation surface of the card transportation path 41 from the top cover unit 13.

The hinge members 55 are rendered on the back side of the internal cover 42. When the top cover unit 13 is opened, the front (the card insertion opening 41*a* side) of the upward-facing internal cover 42 is pulled out to the front of the hybrid device 10, and parts along the card transportation path 41 can be accessed for maintenance from the front of the hybrid device 10.

Figure 5:
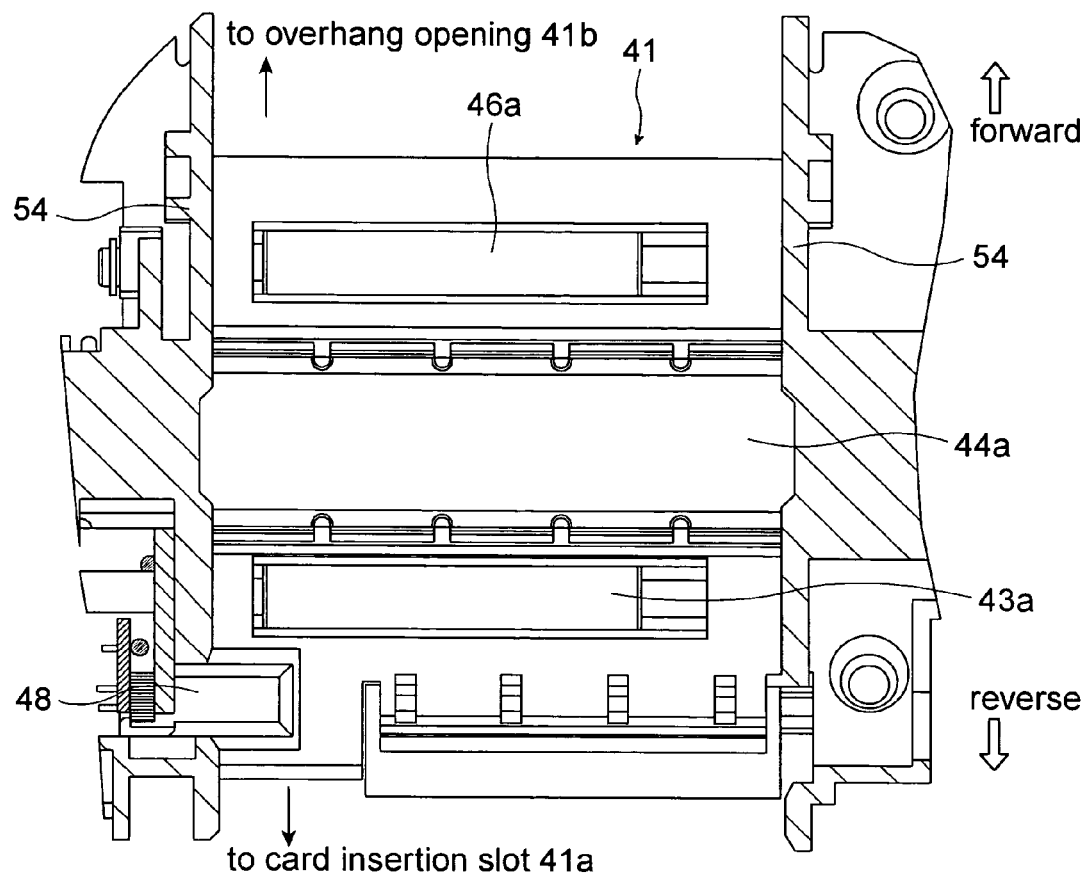
FIG. 5 is a section view showing the top side of the card transportation path in a hybrid device according to a preferred embodiment of the invention.
Figure 5:

As shown in FIG. 5, the guide walls 54 to which the internal cover 42 is assembled function as guide members for correcting the insertion direction of checks S inserted to the card transportation path 41. For example, if a credit card C is inserted skewed to the card transportation direction, the credit card C will contact and be guided by one of the guide walls 54 as the card C is conveyed by the first transportation roller 43*a* and second transportation roller 46*a*. The path of the credit card C will thus be changed and the card C will be aligned with the normal transportation direction.

Therefore, even if the credit card C is inserted skewed to the card transportation direction, the card C will be guided by the guide walls 54 and conveyed in the normal card transportation direction.

This skew correction of the card transportation direction is completed before the credit card C completely passes the scan head 44 as the card C is conveyed from the card insertion opening 41*a* in the forward transportation direction toward the overhang opening 41*b* by means of the first transportation roller 43*a* and second transportation roller 46*a*. After the credit card C completely passes the scan head 44, the card C is reversed and conveyed to the scanning surface 44*a* of the scan head 44 for imaging. The scan head 44 thus always images the front of the credit card C with the card C properly aligned with the normal card transportation direction.

A card detector 48 is provided in the neighborhood of the card insertion opening 41*a* to the card transportation path 41. This card detector 48 is a sensor for detecting if a card C is inserted. Driving the first transportation roller 43*a* and second transportation roller 46*a* starts after the card C is detected by the card detector 48. Inserting a card C thus triggers starting the operation conveying the credit card C through the card transportation path 41.

Figure 6:
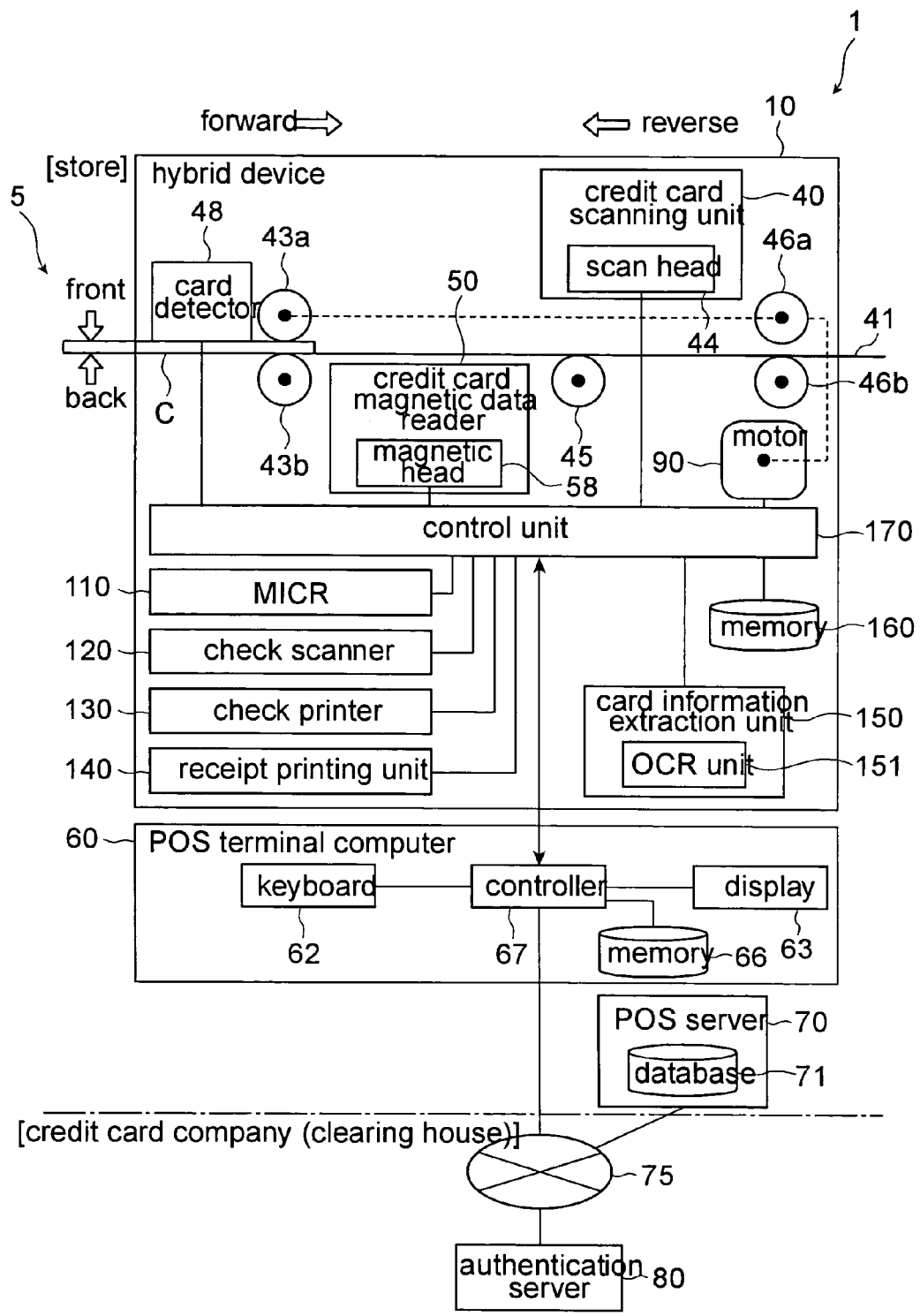
FIG. 6 is a control block diagram of a POS terminal according to a preferred embodiment of the invention.

The control configuration of this hybrid device 10 is described next referring to FIG. 6. As shown in FIG. 6, this hybrid device 10 includes a card detector 48 for detecting insertion of a credit card C; a plurality of transportation rollers 43, 45, 46 located near the card transportation path 41; a motor 90 for driving the feed rollers 43*a*, 46*a* in this transportation roller group; a credit card magnetic data reader 50 having a magnetic head 58 for reading magnetic data from credit cards C; a credit card scanning unit 40 having a scan head 44 for scanning the credit card C surface; a MICR 110 for reading MICR codes from checks S; a check scanner 120 for imaging the front and back of the check S; a check printer 130 for printing transaction information and store information on the front and back (endorsement) of a check S; a receipt printing unit 140 (see FIG. 9) for printing the transaction information and image data captured by the scan head 44 on a receipt R; a card information extraction unit 150 having an OCR unit 151 for extracting credit card number information from the image data captured by the scan head 44; memory 160 for storing the magnetic data read by the magnetic head 58, the image data captured by the scan head 44, and the card number and other information extracted by the OCR unit 151; and a control unit 170 for controlling these other parts of the hybrid device 10.

When the card detector 48 detects that a credit card C was inserted, the control unit 170 starts driving the motor 90 to drive the feed rollers 43*a*, 46*a* and start transporting the credit card C. Forward rotation of the feed rollers 43*a*, 46*a* thus carries the credit card C passed the magnetic head 58 whereby magnetic data is read, and then to a position completely beyond (downstream from) the scan head 44. The feed rollers 43*a*, 46*a* are then reversed to convey the credit card C in the reverse direction.

When the credit card C is conveyed in reverse passed the scan head 44, the control unit 170 drives the scan head 44 to image the front of the credit card C. If the magnetic data was not read correctly in the first forward pass through the card transportation path 41, magnetic stripe reading repeats as the credit card C continues traveling in reverse toward the card insertion slot 41a.

If reading the magnetic data fails in two consecutive attempts, the OCR unit 151 extracts the card number from the image data captured by the scan head 44.

Figure 9:
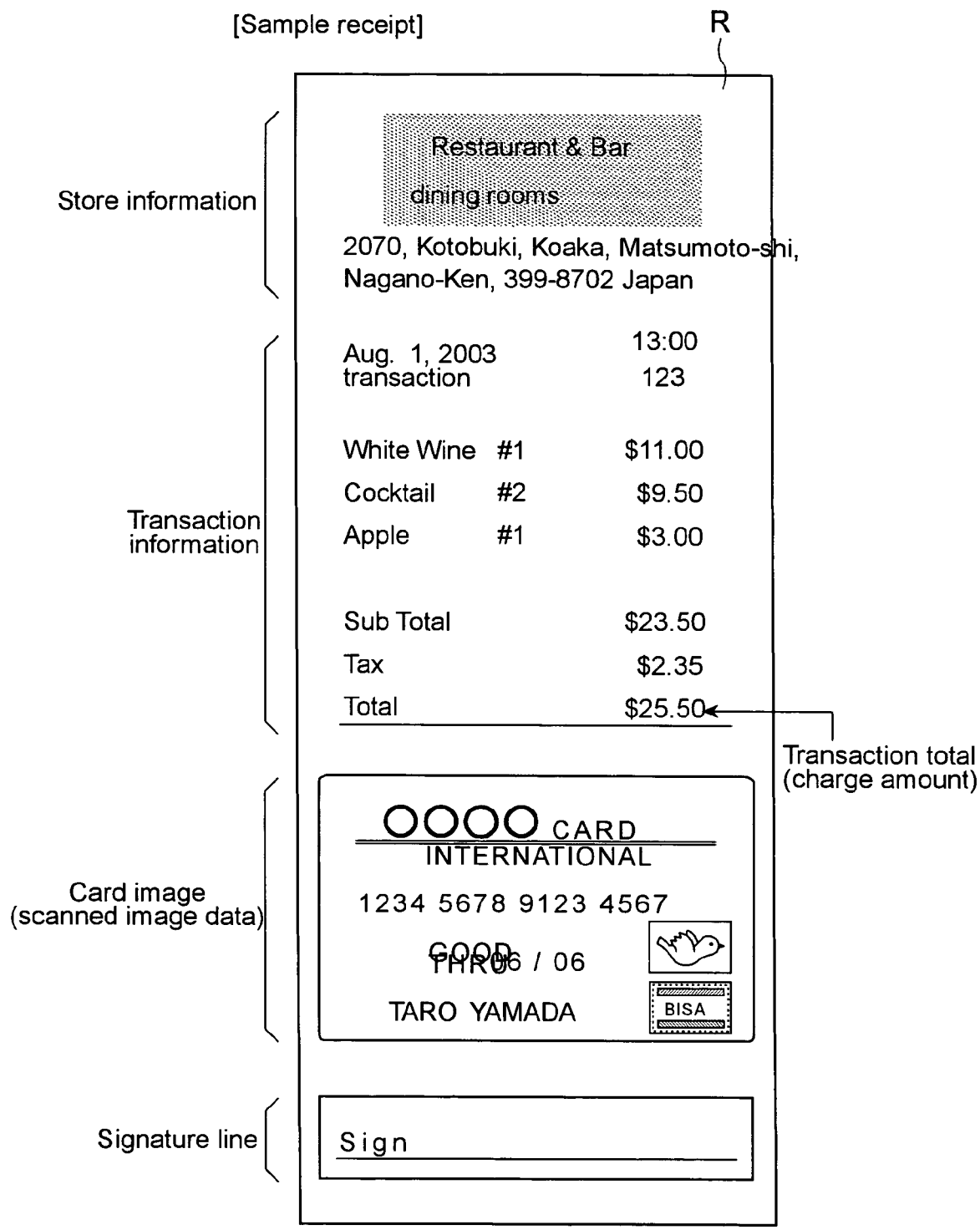
FIG. 9 shows an example of a receipt printed in a preferred embodiment of the invention.

The image data, magnetic data, and OCR result are then temporarily stored in memory 160, and the image data, magnetic data, and OCR result are sent to the POS terminal computer 60 as needed. When the transaction amount and other information is sent from the POS terminal computer 60 after the credit check is completed, the temporarily stored image data, store information data, and data for printing a signature line are added to the transaction data, and a receipt R is printed by the receipt printing unit 140 (see FIG. 9). Note that this data merge operation can be executed by the POS terminal computer 60. In this case, the print data (print file) for printing the information (data) shown in FIG. 9 is sent from the POS terminal computer 60, and the receipt printing unit 140 prints according to the received print data.

The POS terminal computer 60 includes a keyboard 62 for entering product information, a display 63 for displaying the image data sent from the hybrid device 10 and the card information acquired by OCR, memory 66 for temporarily storing the magnetic data and image data sent from the hybrid device 10, and controller 67 for controlling the POS terminal computer 60.

When image data for the credit card surface is sent from the hybrid device 10, the controller 67 displays the image on the display 63 so that the operator can review and confirm the scan. If card information acquired by OCR is also sent from the hybrid device 10, this card information is also displayed on the display 63 with the image data so that the operator can compare the OCR result with the image. See FIG. 10. If an error is found in the OCR result, the operator can correct the error using the keyboard 62.

The controller 67 temporarily stores magnetic data read and sent by the hybrid device 10 to memory 66, and sends the data to the authentication server 80 for a credit check. If the card number optically extracted by the hybrid device 10 is also sent (because reading the magnetic data failed), the card number is also stored temporarily to memory 66, and sent to the authentication server 80 operated by the credit card company or clearing house for verification.

Regardless of whether reading magnetic data succeeded or failed, the controller 67 sends the image data buffered to memory 66 to the POS server 70 after the transaction process. The POS server 70 saves this image data in a database 71 for use as evidence if the credit card C was used illegally.

Figure 7:
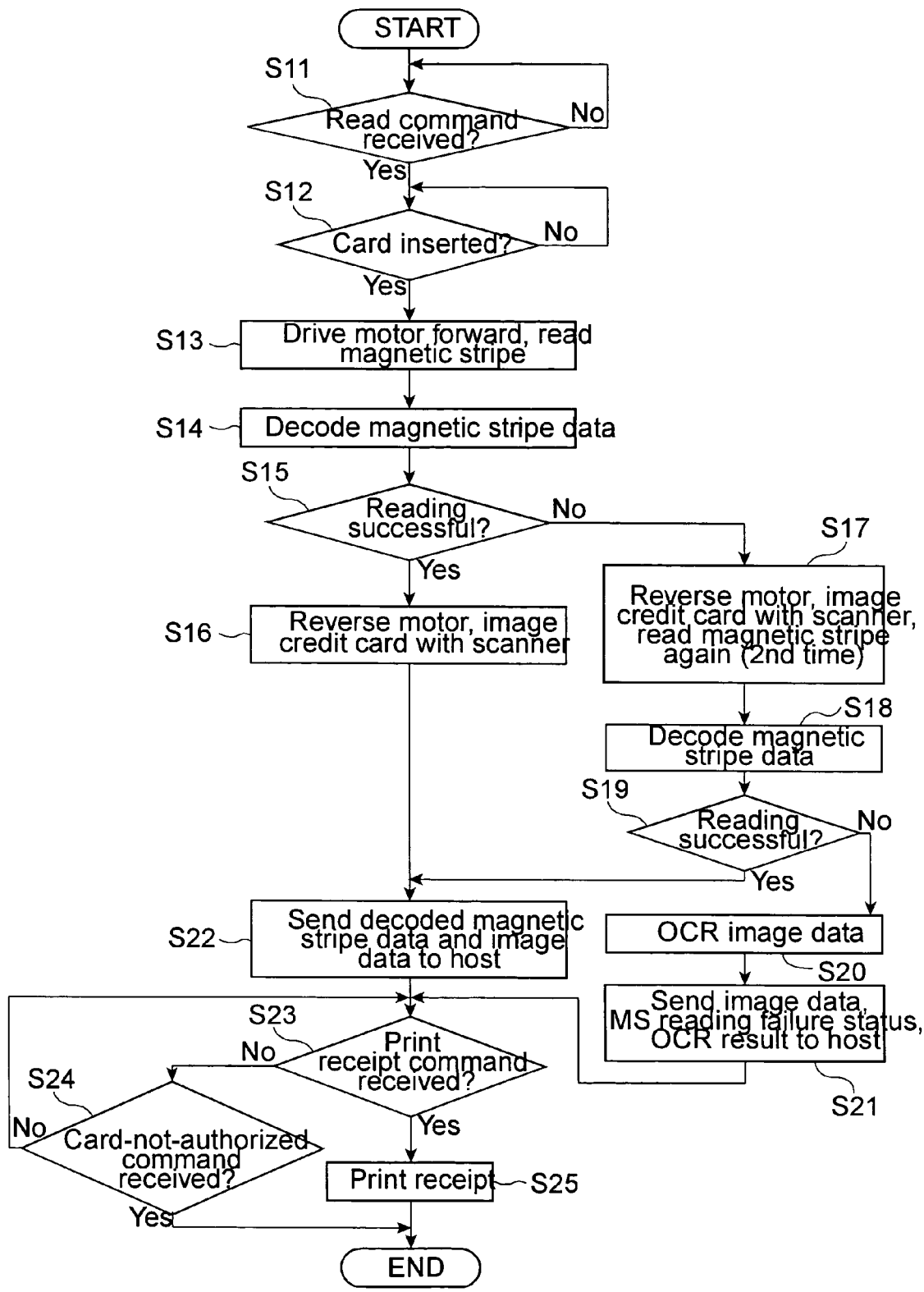
FIG. 7 is a flow chart describing the control method of a hybrid device according to a preferred embodiment of the invention.
Figure 8:
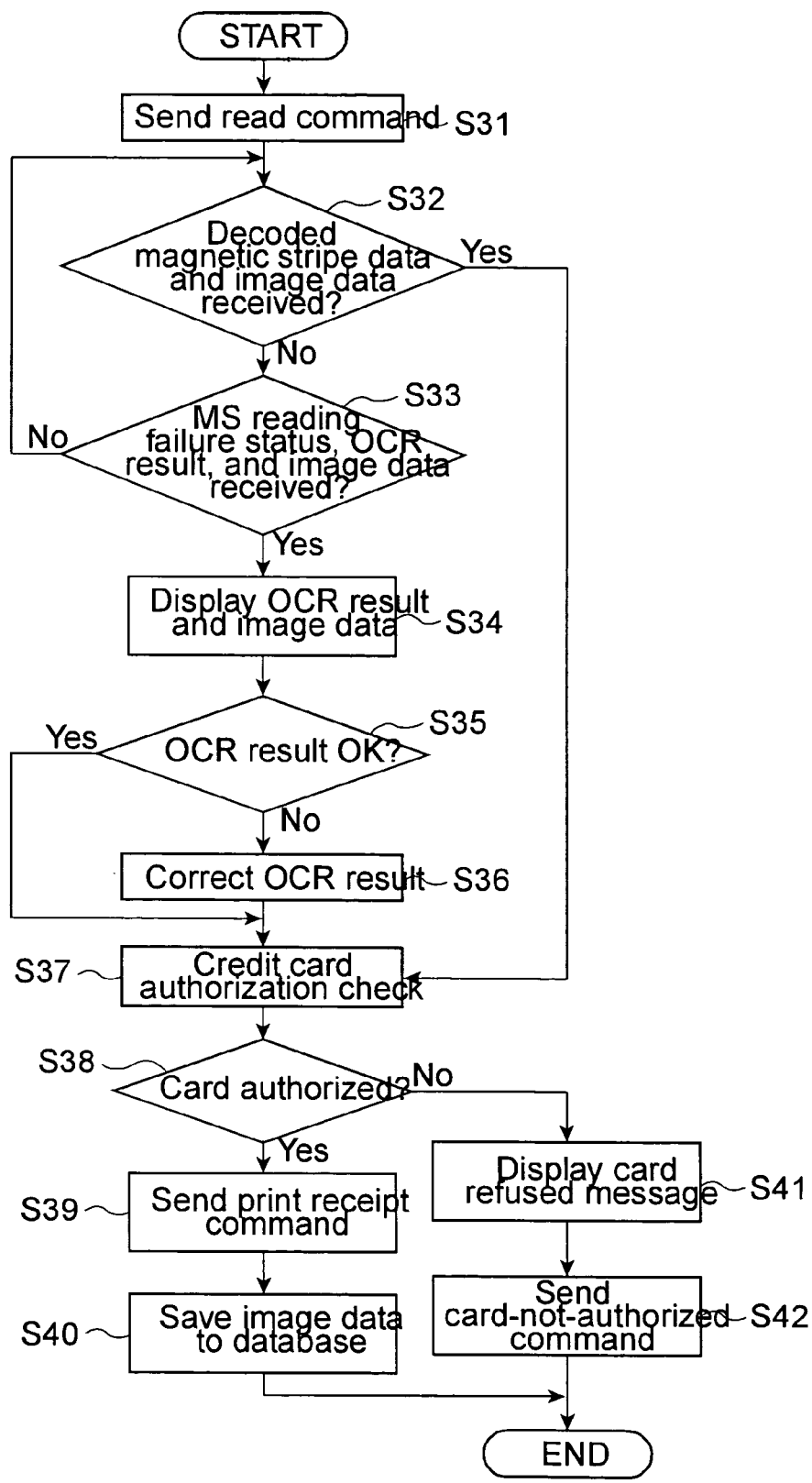
FIG. 8 is a flow chart describing the control method of a POS terminal computer according to the present invention.

The control process of the hybrid device 10 and POS terminal computer 60 is described next below with reference to FIG. 7 and FIG. 8. FIG. 7 is a flow chart of the control process run by the hybrid device 10, and FIG. 8 is a flow chart of the control process run by the POS terminal computer 60.

As shown in FIG. 7, if a read command is received from the POS terminal computer 60 to start reading the credit card C (S11 returns yes), and card insertion is detected by the card detector 48 (S12 returns yes), the hybrid device 10 drives the motor 90 forward to transport the credit card C forward, and the magnetic head 58 reads the magnetic stripe to acquire the magnetic data (S13). After the magnetic data is acquired, the credit card C is conveyed further downstream (forward) to a position completely passed the scan head 44.

The magnetic data is then decoded (S14), and whether the magnetic data was read correctly is determined (S15). If the magnetic data was read correctly (S15 returns yes), the motor 90 is reversed and the credit card surface is imaged by the scan head 44 (S16).

If the magnetic data was not read correctly (S15 returns no), the motor 90 is reversed, the credit card surface is imaged by the scan head 44, and the magnetic stripe is read again to capture the magnetic data (S17). The magnetic data is then decoded (S18), and whether the magnetic data was read correctly on this second pass is determined (S19).

If magnetic data reading also failed the second time (S19 returns no), the image data captured by the scan head 44 is processed by the OCR unit 151 (S20) to extract the card information (such as the card number, card expiration date, and cardholder name). The scanned image data, magnetic stripe (MS) reading failure status indicating that reading the magnetic data failed, and OCR results (card information) are then sent to the host (POS terminal computer 60) (S21). Sending the OCR results could also be used to indicate that magnetic data reading failed, in which case sending the MS reading failure status can be omitted.

However, if the second attempt reading magnetic data succeeds (S19 returns yes), the decoded data read from the magnetic stripe ("decoded MS data" below) and the image data captured by the scan head 44, are sent to the POS terminal computer 60 (S22).

When a print receipt command is then received from the POS terminal computer 60 (S23 returns yes), a receipt R is printed by the receipt printing unit 140 (S25) and the process ends. As shown in FIG. 9, the content of the printed receipt R is not limited to transaction information, and includes store information of fixed content printed at a fixed location, transaction information including the total transaction amount charged to the credit card C, the image of the credit card C scanned by the scan head 44, and a signature line where the customer signs the credit card receipt.

If a card-not-authorized command is received from the POS terminal computer 60 indicating that the credit card C is not authorized for use based on the result of the returned credit check (S23 returns no, S24 returns yes), the transaction is cancelled.

Control of the POS terminal computer 60 is described next referring next to FIG. 8. When the operator finishes entering the product information and then performs some operation indicating payment by credit card C (including pressing the TOTAL key signaling the end of product information entry, or other operation that waits for credit card C insertion, check S insertion, or opening/closing the cash drawer 64), a read command is sent to the hybrid device 10 to read the credit card C (S31). If decoded MS data and image data is then received from the hybrid device 10 (S32 returns yes; see FIG. 7, S22), the magnetic data is sent to the authentication server 80 for a credit check (S37).

Figure 10:
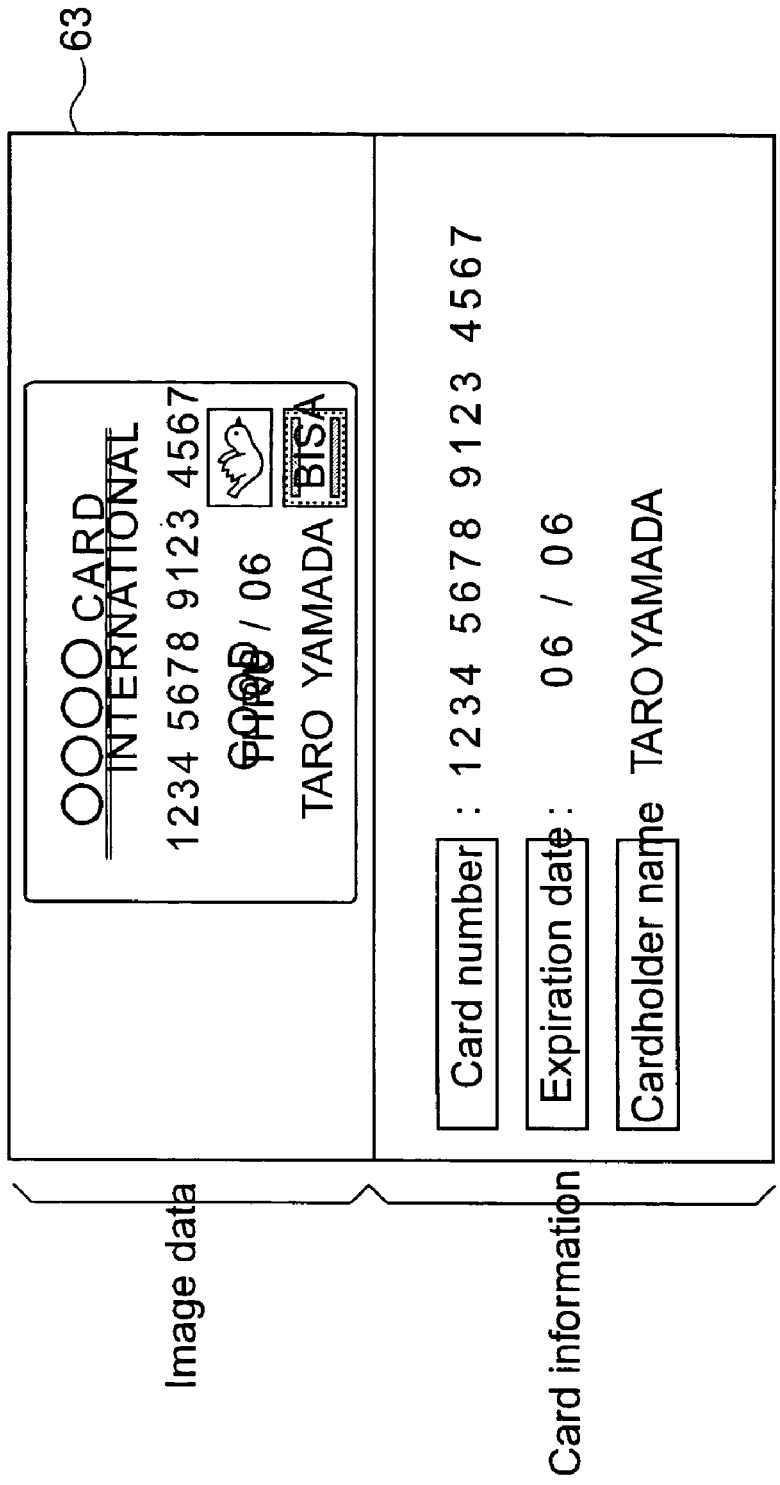
FIG. 10 shows a sample display screen in a preferred embodiment of the invention.

If step S32 returns no and the MS reading failure status, OCR result (card information), and image data were received from the hybrid device 10 (S33, see FIG. 7, S21), the OCR result and image data are displayed on the display 63 (S34). As shown in FIG. 10, an image of the credit card C is shown at the top of the window and the card information (card number, expiration date, name) acquired by OCR is shown at the bottom part of the window in the display 63. By thus simultaneously displaying the credit card image and card information on the display 63, the operator can easily verify if the card number was correctly extracted (that is, if OCR was successful). This prevents running a card authorization check using the wrong credit card number.

If the OCR result differs from the information shown in the displayed image (S35 returns no), the operator uses the keyboard 62 to correct the number (S36), and presses a key to confirm the corrected number and run a credit card check (S37).

If the OCR result matches the image data content, and OCR was thus successful (S35 returns yes), the operator presses a key to confirm the OCR result and run the credit card check (S37).

If the authentication server 80 sends a credit card authorization indicating that the card can be used (S38 returns yes), a print receipt command (including print data for the transaction information and image data) for printing the transaction result is sent to the hybrid device 10 (S39, see FIG. 7, S23), and the image data is sent to the POS server 70 for storage in the database 71.

If the card is refused and cannot be used (S38 returns no), an appropriate message is displayed on the display 63 (S41), thus notifying the operator that the credit card C cannot be used while also sending a card-not-authorized command to the hybrid device 10 (S42, see FIG. 7, S24).

As described above, the credit card processing system, POS terminal, POS system, program, and credit card processing control method of the present invention extract the credit card number by OCR processing image data scanned from the face of the credit card C when the magnetic head 58 is unable to correctly read the magnetic data. As a result, the card information can be acquired quickly and reliably.

Furthermore, because the operator does not need to manually enter the card number, data entry errors and the need to use a manual imprinter are eliminated. The job is therefore made easier and, as a result, job productivity and customer satisfaction can be improved.

Furthermore, because whether the magnetic data was read correctly is determined and the credit card authorization check is run using the conventional magnetic data when reading is successful, OCR processing is not applied to all credit cards C. Credit card transactions can thus be processed more quickly.

Furthermore, by scanning and storing an image of the credit card C, the image data can also be used as evidence in case the credit card was used illegally.

Furthermore, because an image of the credit card C and the transaction information are printed by the receipt printing unit 140 to the receipt R, this receipt R can be used instead of the multipart forms conventionally used with an imprinter, and the cost of managing voucher inventory and the cost of the vouchers is saved.

Furthermore, by printing the transaction amount charged to the credit card, the credit card image, and signature line on the receipt R, which the customer then signs, the credit card, charge amount, and user's signature can be readily confirmed. If the store or credit card company then saves the receipt R, the receipt R can later be used as effective evidence if the credit card was used illegally. The reliability of this information is also improved by printing the unprocessed image data rather than the OCR result.

Productivity is also improved by automatically reading the magnetic data a second time when the magnetic data is not read correctly on the first pass. More specifically, the magnetic data can sometimes be read correctly on a second pass even when the first attempt fails. Therefore, by extracting the card number by OCR processing only when reading magnetic data fails twice consecutively rather than using OCR the first time magnetic stripe reading fails, the number of times that OCR processing is required can be greatly reduced. As a result, the transaction processing time can be shortened.

The hybrid device 10 applies OCR to extract the card information (card number) from the image data when reading the magnetic data fails twice consecutively in the foregoing embodiment, but the OCR process could be run by the POS terminal computer 60. In this case, when the hybrid device 10 twice fails to correctly read the magnetic data (FIG. 7, S19 returns no), the hybrid device 10 skips OCR of the captured image data (S20), and instead sends the image data and MS reading failure status to the POS terminal computer 60. When the POS terminal computer 60 receives the image data and MS reading failure status in a step similar to S33 in FIG. 8, the POS terminal computer 60 applies OCR to the image data and then displays the OCR result on the display 63. By thus running OCR on the POS terminal computer 60, the hybrid device 10 does not need to transmit the OCR result, and data traffic is thus reduced. The POS terminal computer 60 also typically has a relatively high performance CPU, and can therefore complete the OCR process quickly.

Furthermore, the image data is printed to the receipt R regardless of whether the magnetic data was correctly read, but printing the image data could be omitted when the magnetic data is correctly read. This is because the magnetic data is more reliable than OCR data, and printing the image data is therefore considered unnecessary.

Furthermore, the functions (means) of the foregoing hybrid device 10 and POS terminal computer 60 can also be provided as a computer-executable program.

This program can also be recorded to a data storage medium (not shown) and installed to a personal computer. The credit card processing control method of the present invention can thus be rendered using a device other than a POS system 1.

The program storage medium could be a CD-ROM, flash ROM, memory card (Compact Flash (R), Smart Media, memory stick or other), Compact Disc, magneto-optical disc, DVD, or floppy disk, for example.

The functions of the hybrid device 10 could also be incorporated in the POS terminal computer 60 and rendered as a single unit.

Furthermore, the check processing function and receipt R printing function could also be omitted from the hybrid device 10 and rendered in an independent credit card processing terminal.

The invention shall not the limited to the foregoing embodiments, and can be varied in many ways without departing from the scope of the accompanying claims.

For example, if magnetic stripe reading fails in step S19, FIG. 7 (S19 returns no), the image data could be printed together with a signature line to the receipt R instead of running the OCR process in step S20. The customer then signs the signature line and the store retains the signed receipt as proof of the transaction.

The invention claimed is:

1. A card processing apparatus for processing a card containing magnetic data and image information inclusive of card number on a surface of the card comprising:
    a magnetic data reader for reading magnetic data from the card;
    an image scanner for imaging image data from the surface of the card containing the image information;
    an image data storage memory for storing the image data captured by the image scanner;
    a control unit for controlling the operation of the magnetic data reader and the image scanner;

a reading evaluator under the control of the control unit for determining if the magnetic data reader has successfully read the magnetic data from the card;

a computer under the control of the control unit which includes said reading evaluator for determining if magnetic data has been read and decoded successfully; and a card information extraction unit including an OCR processor under the control of said control unit for extracting the card number from the surface information on the card by OCR processing of the image data when the reading evaluator in said computer determines that the magnetic data reader has failed to successfully read the magnetic data.

2. The card processing apparatus as described in claim 1, further comprising:

a printer for printing the image data and a signature line with a receipt in response to when the reading evaluator determines that the reading of magnetic data has failed.

3. The card processing apparatus as described in claim 2 further comprising a printer for printing the image data to receipt paper.

4. The card processing apparatus as described in claim 3, wherein the printer prints the card transaction amount and a signature line for the card user together with the image data.

5. The card processing apparatus as described in claim 1 further comprising a drive mechanism for moving said card from a first position to a second position and a motor for controlling said drive mechanism wherein said control unit operates said motor and drive mechanism and controls when said magnetic data reader is to read magnetic data from said card.

6. The card processing apparatus as described in claim 1 further comprising a drive mechanism for moving said card from a first position to a second position and a motor for controlling said drive mechanism wherein said control unit operates said motor and drive mechanism and controls when said magnetic data reader is to read magnetic data from said card.

7. The card processing apparatus as described in claim 6 wherein said control unit drives said drive mechanism in reverse to repeat the reading of magnetic data if the reading evaluation unit determines that the reading of magnetic data has failed and further controls the operation of said card information extraction unit such that if the magnetic data reader has failed twice consecutively the card number extraction unit will operate to extract the card number of the card.

8. The card processing apparatus as described in claim 1, further comprising a display for simultaneously displaying the image data and card number.

9. A POS terminal comprising a card processing apparatus as described in claim 1, which includes said computer for processing transaction(s) based on product information entered by an operator.

10. A POS terminal as defined in claim 9 further comprising a POS server connected to and centrally controlling the POS terminal over a network.

11. A card processing apparatus for processing a card containing magnetic data and image information inclusive of card number on a surface of the card comprising:

a magnetic data reader for reading magnetic data from the card;

an image scanner for imaging image data from the surface of the card containing the image information;

an image data storage memory for storing the image data captured by the image scanner;

a control unit for controlling the operation of the magnetic data reader and the image scanner;

a reading evaluator under the control of the control unit for determining if the magnetic data reader has successfully read the magnetic data from the card; and a printer for printing the image data and a signature line with a receipt in response to when the reading evaluator determines that the reading of magnetic data has failed.

12. The card processing apparatus as described in claim 11 further comprising a drive mechanism for moving said card from a first position to a second position and a motor for controlling said drive mechanism wherein said control unit operates said motor and drive mechanism and controls when said magnetic data reader is to read magnetic data from said card.

13. The card processing apparatus as described in claim 12 wherein said control unit drives said drive mechanism in reverse to repeat the reading of magnetic data if the reading evaluation unit determines that the reading of magnetic data has failed.

14. The card processing apparatus as described in claim 11, further comprising a display for simultaneously displaying the image data and card number.

15. A POS terminal comprising a card processing apparatus as described in claim 14 which includes said computer for processing transaction(s) based on product information entered by an operator.

16. A card processing apparatus for processing a card containing magnetic data and image information inclusive of card number on a surface of the card comprising:

a magnetic data reader for reading magnetic data from the card;

an image scanner for imaging image data from the surface of the card containing the image information;

an image data storage memory for storing the image data captured by the image scanner;

a control unit for controlling the operation of the magnetic data reader and the image scanner;

a reading evaluator under the control of the control unit for determining if the magnetic data reader has successfully read the magnetic data from the card; and a drive mechanism for moving said card from a first position to a second position and a motor for controlling said drive mechanism wherein said control unit operates said motor and drive mechanism and controls when said magnetic data reader is to read magnetic data from said card; and wherein said control unit drives said drive mechanism in reverse to repeat the reading of magnetic data if the reading evaluation unit determines that the reading of magnetic data has failed.

17. A card processing control method for controlling the operation of card processing apparatus for processing card information stored as magnetic data in the card and image data inclusive of card number on a surface of the card with the card processing apparatus including a magnetic data reader for reading the magnetic data from the card, an image scanner for imaging the card image data on the surface of the card and an image data storage memory for storing the image data captured by the image scanner; with said control method comprising the steps of:

reading the magnetic data in said card; scanning the image data from the surface of the card;

storing the card image data in said memory;

determining if the magnetic data reader has successfully read the magnetic data or has failed to do so;

using an OCR processor for extracting the card number from the image data when the magnetic data reader has failed to read the magnetic data; and running a card check to determine if proper authorization has been received or granted based on the extracted card number.

18. The card processing control method as described in claim 17 further comprising the step of printing the image data to receipt paper.

19. The card processing control method as described in claim 18, wherein the printing step prints the card transaction amount and a signature line for the t card user together with the image data.

20. The card processing control method as described in claim 19, further comprising the step of repeating the step of reading the magnetic data when the magnetic data reader has failed to successfully read the magnetic data, and if the magnetic data reading fails twice, consecutively, executing the step of using an OCR processor for extracting the card number of the card from the image data for conducting a credit card authorization check.

21. The card processing control method as described in claim 20, further comprising the step of displaying the image data and card number.

22. The card processing control method as described in claim 17, further comprising the step of displaying the image data and card number.

23. A card processing system for processing a card containing magnetic data and image data on a surface of the card inclusive of the card number comprising:

a magnetic data reader for reading the magnetic data from the card;

an image scanner for imaging the surface of the card containing the image data;

an image data storage memory for storing the image data captured by the image scanner;

a control unit for controlling the operation of the magnetic data reader and the image scanner;

a card information extraction unit including an OCR processor and a computer under the control of the control unit for determining if the magnetic data reader has successfully read magnetic data from the card and if not for operating the card information extraction unit to extract the card number from the card.

24. A card processing system as described in claim 23 where said computer contains a computer program enabling said computer to determine if the magnetic data reader has successfully read magnetic data from the card or not.

25. A card processing system as described in claim 24 further comprising an authorization server for authorizing the authentification of the card based upon said magnetic data or said extracted card number.

26. A card processing system as described in claim 25 wherein said computer is POS terminal computer and further comprising a POS server for controlling the POS terminal over a network.

* * * * *